United States Patent
Abhishek et al.

(10) Patent No.: US 12,506,670 B2
(45) Date of Patent: Dec. 23, 2025

(54) APPARATUSES AND METHODS FOR FACILITATING DATA-AWARE COMPUTING AND STORAGE MANAGEMENT FUNCTIONS FOR COMMUNICATION NETWORKS AND SYSTEMS

(71) Applicant: AT&T Intellectual Property I, L.P., Atlanta, GA (US)

(72) Inventors: Rohit Abhishek, Cumming, GA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 176 days.

(21) Appl. No.: 18/191,899

(22) Filed: Mar. 29, 2023

(65) Prior Publication Data

US 2024/0333618 A1 Oct. 3, 2024

(51) Int. Cl.
*H04L 43/0817* (2022.01)
*H04L 41/5019* (2022.01)
*H04L 41/5051* (2022.01)
*H04W 28/16* (2009.01)
*H04W 48/18* (2009.01)

(52) U.S. Cl.
CPC ...... *H04L 43/0817* (2013.01); *H04L 41/5019* (2013.01); *H04L 41/5051* (2013.01); *H04W 28/16* (2013.01); *H04W 48/18* (2013.01)

(58) Field of Classification Search
CPC ............ H04L 43/0817; H04L 41/5019; H04L 41/5051; H04W 28/16; H04W 48/18
See application file for complete search history.

(56) References Cited

U.S. PATENT DOCUMENTS

| | | | |
|---|---|---|---|
| 10,819,606 B2* | 10/2020 | Shaw | H04L 41/0897 |
| 11,405,310 B2* | 8/2022 | Dowlatkhah | H04L 41/5051 |
| 2017/0086118 A1* | 3/2017 | Vrzic | H04W 36/26 |
| 2019/0028249 A1* | 1/2019 | Rost | H04L 5/0037 |
| 2019/0373520 A1* | 12/2019 | Sillanpää | H04W 36/14 |
| 2020/0068643 A1* | 2/2020 | Dowlatkhah | H04W 12/08 |
| 2020/0245185 A1* | 7/2020 | Shaw | H04W 28/0268 |
| 2021/0345357 A1* | 11/2021 | Ijntema | H04L 47/781 |
| 2021/0385741 A1* | 12/2021 | Corston-Petrie | H04W 48/18 |
| 2022/0264685 A1* | 8/2022 | Paczkowski | H04W 24/08 |
| 2022/0417726 A1* | 12/2022 | Srivastava | H04W 48/18 |

* cited by examiner

*Primary Examiner* — Brian J. Gillis
*Assistant Examiner* — Chhian (Amy) Ling
(74) *Attorney, Agent, or Firm* — Guntin & Gust, PLC; Erik Boyd

(57) ABSTRACT

Aspects of the subject disclosure may include, for example, obtaining data, the data including first data indicative of a first amount of resources available as part of a first network slice of a plurality of network slices of a communication network, analyzing the data to determine that at least a first portion of a service provisioned via the first network slice is to be reallocated to at least a second network slice of the plurality of slices, and reallocating, based on the analyzing, the at least a first portion of the service to the at least a second network slice. Other embodiments are disclosed.

20 Claims, 9 Drawing Sheets

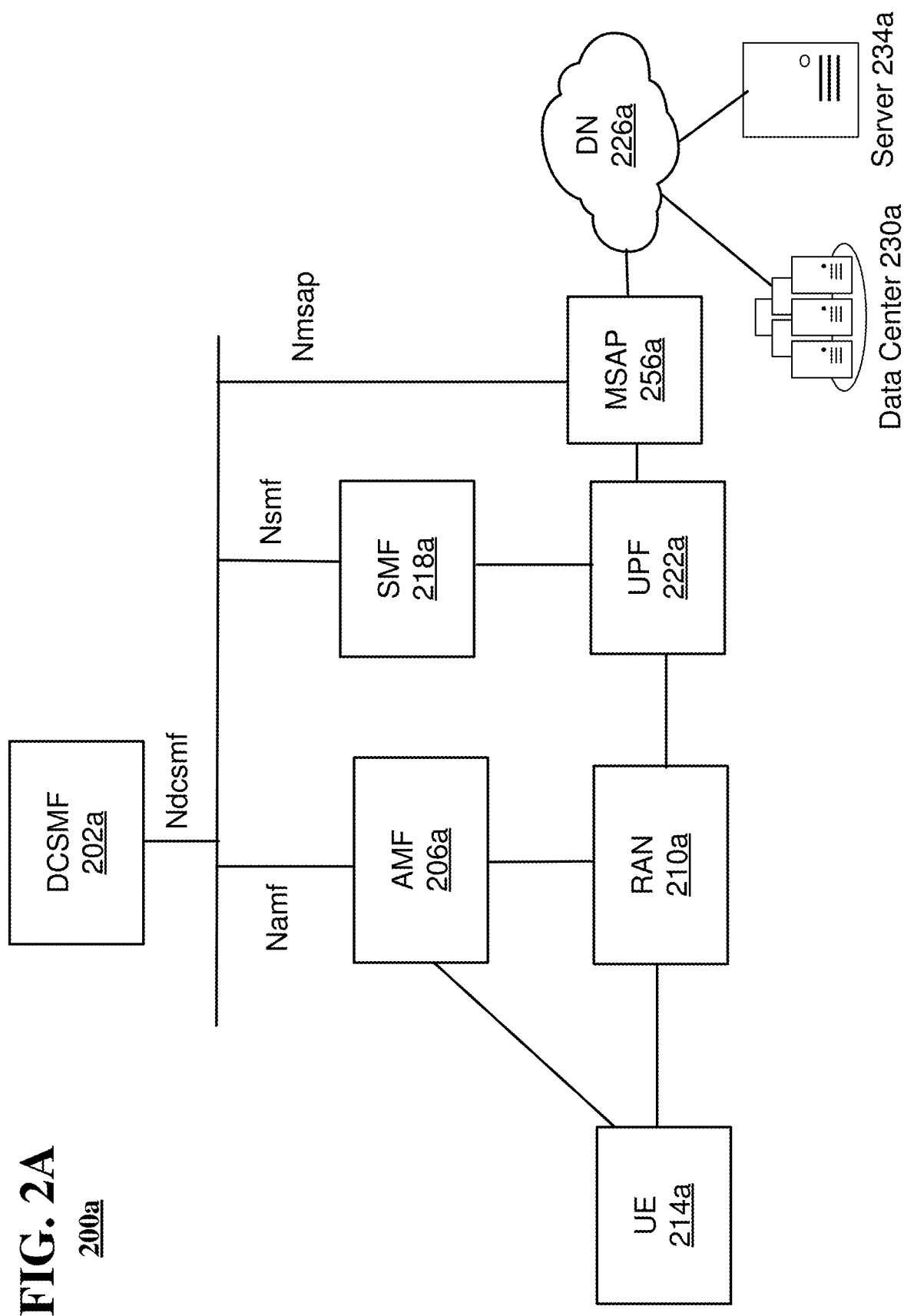

200b

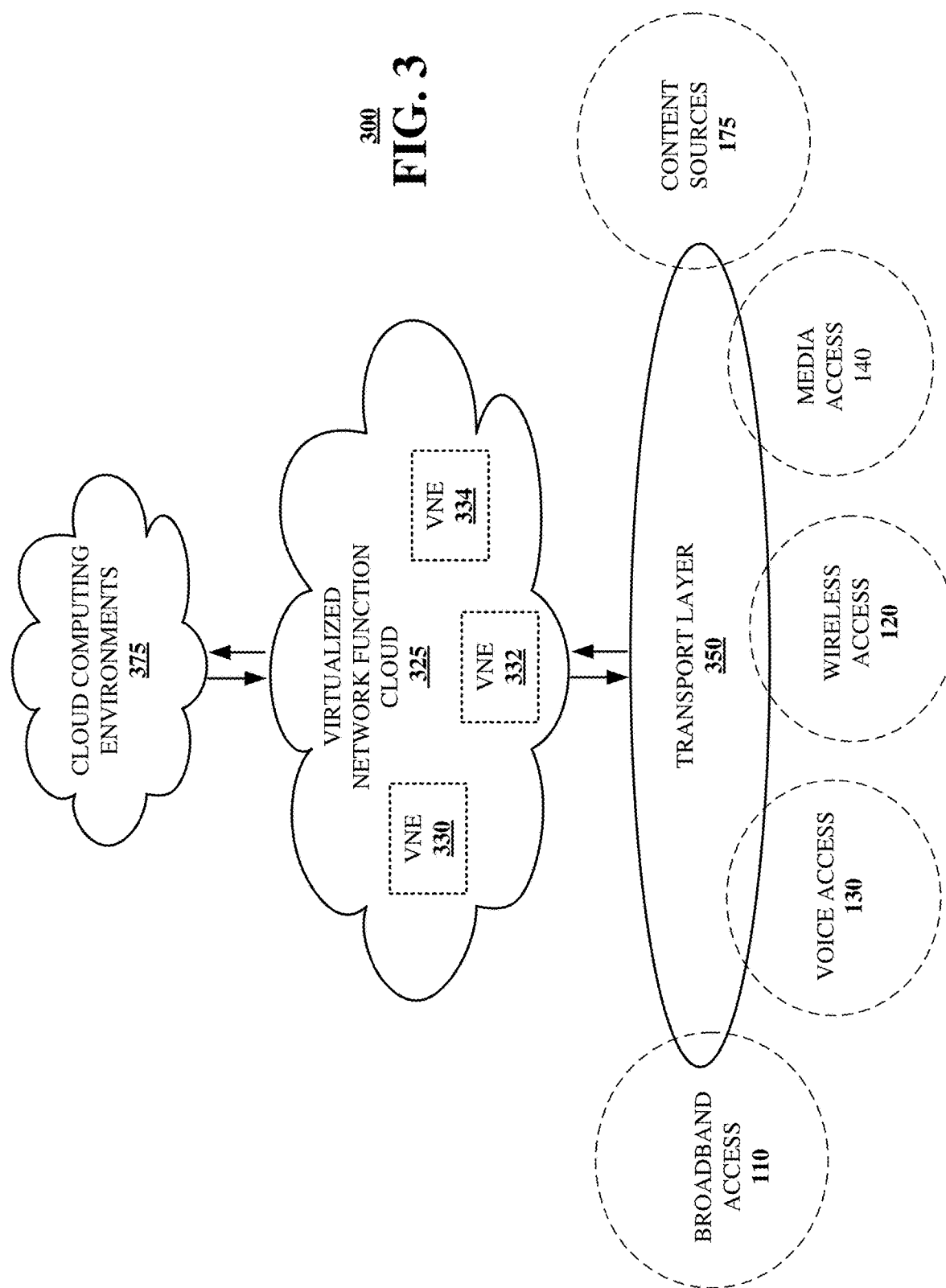

APPARATUSES AND METHODS FOR FACILITATING DATA-AWARE COMPUTING AND STORAGE MANAGEMENT FUNCTIONS FOR COMMUNICATION NETWORKS AND SYSTEMS

FIELD OF THE DISCLOSURE

The subject disclosure relates to apparatuses and methods for facilitating data-aware computing and storage management functions for communication networks and systems.

BACKGROUND

As the world increasingly becomes connected via various communication networks and systems and via various communication devices, additional opportunities are generated to provision communication services to the communication devices. Applications may be used to facilitate the communication services. To realize the full capacity of next generation (e.g., Sixth Generation (6G)) applications, a high-end hardware device may be required. This requirement arises because next generation applications, including augmented reality (AR) applications, virtual reality (VR) applications, and cross or extended reality (XR) applications, are likely to require large amounts of processing power and storage. With an increasing number of high computational applications, the requirement for device processing capacity has increased. Further, these types of applications frequently require real-time processing and/or ultra-low latency to achieve given requirements. Therefore, the current challenges in using such applications include capacity, processing capability, and energy consumption. The challenges are increasing in nature/scope due to the massive processing/data load of the applications executing on the devices.

Heavy or material-rich (e.g., silicon-rich) devices featuring high processing capacity/capabilities make the devices expensive to manufacture/fabricate, ship/transport, etc. With limited resource availability at a device, processing tasks that require more than an available amount of resources would add computational and processing latencies, such that offloading a portion of the processing tasks to another device may be required.

Distributed computing is a solution which is expected to be integrated in next generation architectures/platforms. Distributed cooperative computing may be defined as a technology that includes multiple components on multiple systems/nodes, but functionally executes as a single entity. These system/nodes can be physically close together and connected by a local network, or they can be geographically distant/dispersed and connected by a wide area network. A distributed system can include any number of possible configurations.

Signaling for mobile networks prior to 6G was largely designed for voice communications. However, 6G must be able to efficiently deal with other types of communications, such as data transfer/conveyance operations as part of data-rich applications. Given that many of the applications driving the need for integration of communications and computing have very demanding requirements, the signaling in next generation systems and networks must efficiently support the dynamic discovery, moving/reallocating, and processing of data and computing/computational loads.

In, e.g., 6G, ubiquitous computing will allow a workload to be distributed across and among devices, network nodes, and data centers to achieve many benefits, such as processing massive data close to the source to minimize data transport, leveraging specialized computing capabilities to improve performance, dynamically adapting to network dynamics, and augmenting versatile requirements. Therefore, 6G is expected to provide an intelligent set of communication, computing, and data services that are more tightly coupled with one another compared to, e.g., a Fifth Generation (5G) mobile networks. In addition to communication services, computing and data planes with dedicated computing and data functions may be introduced to cellular networks to enable interoperability.

To date, a 5G system supports a limited set of services for data management (e.g., Unified Data Management (UDM), Unified Data Repository (UDR), and Unstructured Data Storage Function (UDSF), Data Collection Coordination Function (DCCF), and Network Data Analytics Function (NWDAF)). These services are primarily focused on managing subscription information and data between the 5G core network functions.

The Third Generation Partnership Project (3GPP) has defined the network data analytics function (NWDAF) as a standard function within core networks/systems for automation and intelligence of 5G networks. NWDAF derives analytics by using machine learning (ML) or artificial intelligence (AI) algorithms/models and provides these analytics to other network functions (NFs). NWDAF includes an analytics logical function (AnLF) that performs inference generation and generates analysis information (i.e., derives statistics and/or predictions based on an Analytics Consumer request). A model training logical function (MTLF) trains the ML/AI algorithm/model used in the inference function/generation and provides the trained model/algorithm for (future) use.

Using a microservices based software architecture, service logic may be broken down to a series of loosely coupled microservices, distributed across different locations and nodes or computational hosts. The microservice communication fabric (which may also be referred to as a service mesh), enables communication between microservices over a network with operational control to support traffic management, quality of service (QOS) or quality of experience (QoE), security, and so on. 5G adopted service mesh for communication among NFs within a 5G core network, which may be extended to further enable workload disaggregation for radio access networks (RANs) or applications on devices.

5G systems and networks currently lack data centric services targeted towards application optimization and load balancing. For example, services which can securely offload, load-balance, and process application data and provide value-add services such as application data-aware event detection, and trigger and perform application-defined actions, are currently lacking.

As the foregoing demonstrates, there exists a substantial gap between the capabilities of the current state of the art and the requirements for applications, services, and devices moving forward as part of next generation systems and networks. Aspects of this disclosure address these needs and other needs.

BRIEF DESCRIPTION OF THE DRAWINGS

Reference will now be made to the accompanying drawings, which are not necessarily drawn to scale, and wherein:

FIGS. 2A-2C are block diagrams illustrating an example, non-limiting embodiments of systems in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for facilitating a data-aware computing and storage management function (DCSMF) for one or more communication networks and systems, such as for example a 6G communication network or system. In some embodiments, the DCSMF may dynamically decide policies for traffic and storage enhancement (e.g., optimization) based on required and available resources. The DCSMF may interact with data management services (e.g., UDM, UDR, UDSF, DCCF, NWDAF, etc.) to collect required data for an analytics function (AF) and use the data to frame data-centric policies. Other embodiments are described in the subject disclosure.

One or more aspects of the subject disclosure include, in whole or in part, obtaining data, the data including first data indicative of a first amount of resources available as part of a first network slice of a plurality of network slices of a communication network; analyzing the data to determine that at least a first portion of a service provisioned via the first network slice is to be reallocated to at least a second network slice of the plurality of slices; and reallocating, based on the analyzing, the at least a first portion of the service to the at least a second network slice.

One or more aspects of the subject disclosure include, in whole or in part, analyzing data pertaining to: a requirement of an application, an amount of resources consumed relative to a capacity of the resources, and a network condition; determining, based on the analyzing, that at least some of a network functionality is to be transferred from a first portion of a network slice to a second portion of the network slice as part of providing communication services in relation to an execution of the application; and transferring, based on the determining, the at least some of a network functionality from the first portion to the second portion.

One or more aspects of the subject disclosure include, in whole or in part, collecting, by a processing system including a processor, data from a plurality of slices of a communication system; identifying, by the processing system, a security parameter associated with a function facilitated by the communication system; analyzing, by the processing system, the data in conjunction with the security parameter to determine that the function is to be reallocated from a first resource to a second resource that is different from the first resource, resulting in a determination; and reallocating, by the processing system, the function from the first resource to the second resource in accordance with the determination.

Figure 1:
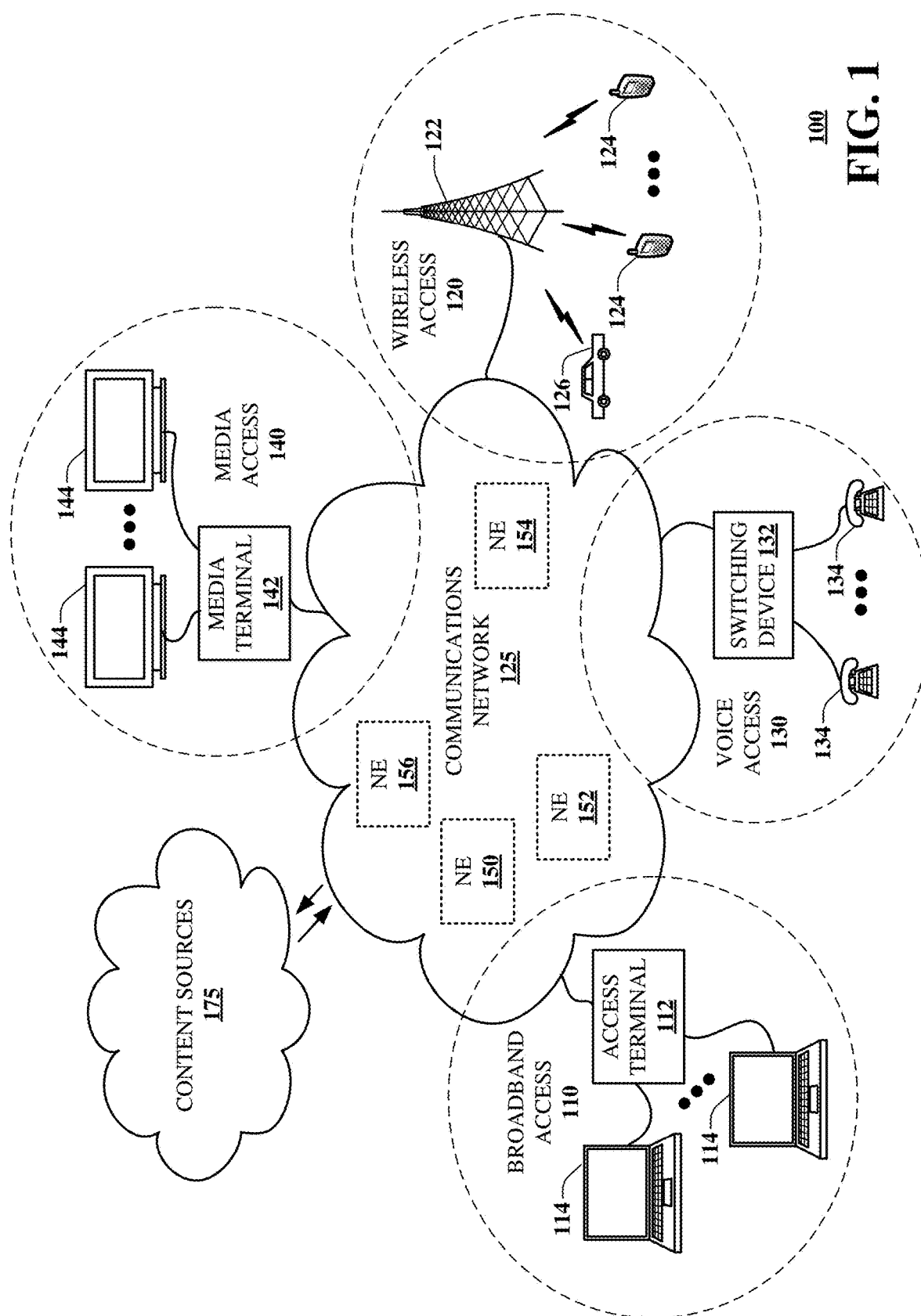
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, the system 100 can facilitate in whole or in part obtaining data, the data including first data indicative of a first amount of resources available as part of a first network slice of a plurality of network slices of a communication network, analyzing the data to determine that at least a first portion of a service provisioned via the first network slice is to be reallocated to at least a second network slice of the plurality of slices, and reallocating, based on the analyzing, the at least a first portion of the service to the at least a second network slice. The system 100 can facilitate in whole or in part analyzing data pertaining to: a requirement of an application, an amount of resources consumed relative to a capacity of the resources, and a network condition, determining, based on the analyzing, that at least some of a network functionality is to be transferred from a first portion of a network slice to a second portion of the network slice as part of providing communication services in relation to an execution of the application, and transferring, based on the determining, the at least some of a network functionality from the first portion to the second portion. The system 100 can facilitate in whole or in part collecting, by a processing system including a processor, data from a plurality of slices of a communication system, identifying, by the processing system, a security parameter associated with a function facilitated by the communication system, analyzing, by the processing system, the data in conjunction with the security parameter to determine that the function is to be reallocated from a first resource to a second resource that is different from the first resource, resulting in a determination, and reallocating, by the processing system, the function from the first resource to the second resource in accordance with the determination.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, 6G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, 6G, or higher generation modem, an optical modem and/or other access devices.

In various embodiments, the base station or access point 122 can include a 4G, 5G, 6G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a in accordance with various aspects described herein. In some embodiments, one or more parts/portions of the system 200a may function within, or may be operatively overlaid upon, one or more parts/portions of the system 100 of FIG. 1. The system 200a may be implemented using hardware, software, firmware, or any combination thereof. In some embodiments, one or more aspects of the system 200a may be facilitated or implemented via one or more processing systems.

Illustratively, the system 200a may include a data-aware computing and storage management function (DCSMF) 202a, an access and mobility management function (AMF) 206a, a radio access network (RAN) 210a, a client device or user equipment (UE) 214a, a session management function (SMF) 218a, a user plane function (UPF) 222a, and a data network (DN) 226a. The DN 226a may be associated with, include, or be communicatively coupled to/with, a data center 230a and/or a server 234a (e.g., an edge server). In operation, the DCSMF 202a may be used for managing different cloud instances for computing and storage as well managing policies related to the onloading and offloading of data and load balancing of data. The DCSMF 202a operations may be based on dynamic conditions or circumstances (which may be embodied or represented by data, analytics, statistics, or the like), and available computing and storage resources may trigger a secure service or application offloading among different edge or cloud computing hosts or resources. The DCSMF 202a may expose an AF with cloud synchronization capabilities, with an availability to provide distributed computing fabrics, meshes, and storage.

The DCSMF 202a may be coupled to, e.g., the AMF 206a and/or the SMF 218a via one or more interfaces, illustratively represented by Ndcsmf, Namf, and Nsmf in FIG. 2A. One or more of the interfaces or connections/links between the entities shown in FIG. 2A may correspond to a service-based interface in some embodiments. The various interfaces or connections/links between the entities shown in FIG. 2A may enable the DCSMF 202a to provide a data-centric function that coordinates with, e.g., the AMF 206a, the SMF 218a, the UPF 222a (and potentially other functions or entities not shown in FIG. 2A, such as NWDAF or UDM) to determine/decide offload and onload policies dynamically based on the UE 214a, edge server 234a, and/or data center 230a resource availability, and/or the QoS/QoE required by applications supported by the system 200a. In brief, centralized intelligence may dynamically be obtained/realized to control resource management and facilitate distributed computing based on application or service policies or requirements.

In some embodiments, the AMF 206a, after receiving a request for distributed computing and storage, may forward information to the DCSMF 202a. In turn, the DCSMF 202a may coordinate with, e.g., the UDM (or another entity or function) to check for access authorization to different edge cloud and data center (see, e.g., data center 230a and server 234a) resources, and data network (see, e.g., DN 226a) profiles. The DCSMF 202a may coordinate with the SMF 218a to determine/identify a session manager that should be assigned to the UE 214a based on the application requirements.

In some embodiments, the DCSMF 202a may store indications/indicators of resource availability for, e.g., a cloud network (or other network) participating in distributed computing and storage. Once a request is obtained, based on the resource availability the DCSMF 202a may decide/elect an offload/onload policy and send the policy (or an indication of the same) to the SMF 218a for session establishment and/or management. The DCSMF 202a may also coordinate with, e.g., an NWDAF (or other function or entity) for automation based on network data.

In some embodiments, once the UE 214a initiates a distributed computing request, an AF request for distributed computing may be sent to the DCSMF 202a. The DCSMF 202a may coordinate with, e.g., a UDM (or other entity or function) to check for access authorization to different edge cloud and data center (see, e.g., data center 230a and server 234a), and data network (see, e.g., DN 226a) profiles. The DCSMF 202a may coordinate with the SMF 218a to determine/identify a session manager that should be assigned to the UE 214a based on the application requirements.

Based on any required resources for the AF and the resource availability in the UE 214a, edge 234a, and/or data center 230a, the DCSMF 202a, after coordinating with, or in conjunction with, UDM, user-defined routes (UDRs), an unstructured data storage function (UDSF), and/or a data collection coordination function (DCCF), may send a request with traffic routing information to a policy control function (PCF) targeting UE(s) (e.g., the UE 214a) with service information. The UEs may be identified, and distinguished from one another and from other devices, based on one or more identifiers (e.g., one or more addresses). The identifiers may be included as part of the request and/or as part of service information and may act/function as criteria to identify the UE(s) that the request is targeting or associated with, so the traffic routing information can be applied to protocol data units (PDUs) which are allowed to access or associate with the application. The service information, and/or any related information, may be stored in, or included as part of, the UDR(s) and delivered to the PCF following an existing application function influence on a traffic routing procedure/policy.

Figure 2B:
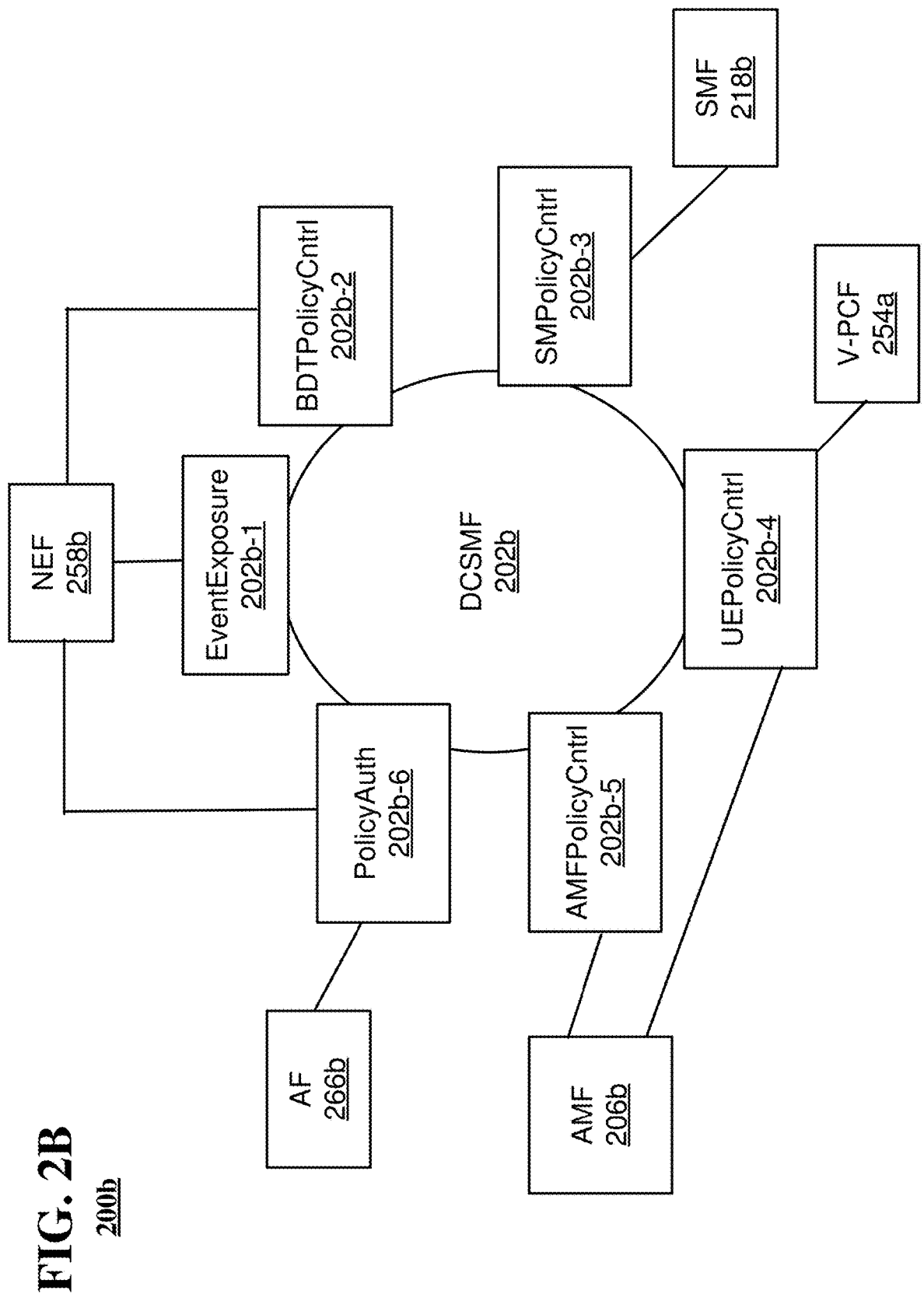

Referring now to FIG. 2B, an exemplary system 200b in accordance with various aspects of this disclosure is shown. In some embodiments, one or more portions/parts of the system 200b may be combined with, or operatively overlaid upon, one or more parts/portions of the system 100 of FIG. 1 and/or one or more parts/portions of the system 200a of FIG. 2A. The system may include a DCSMF 202b (which may correspond to the DCSMF 202a of FIG. 2A), an AMF 206b (which may correspond to the AMF 206a of FIG. 2A), an SMF 218b (which may correspond to the SMF 218a of FIG. 2A), a visited PCF (V-PCF) 254a, a network exposure function (NEF) 258b, and an AF 266b.

The DCSMF 202b may include, or be associated with, a number of functions or services, such as for example an event exposure service 202b-1, a background data transfer (BDT) policy control (Cntrl) service 202b-2, a session management (SM) policy control service 202b-3, a UE policy control service 202b-4, an AMF policy control service 202b-5, and a policy authorization (Auth) service 202b-6. The event exposure service 202b-1 may allow other NFs to subscribe to notification of DCSMF 202b related events. The BDT policy control service 202b-2 may provide a BDT policy to the NEF 258b for distributed computing and storage. The SM policy control service 202b-3 may provide one or more data-centric PDU session related policies to the SMF 218b. The UE policy control service 202b-4 may provide for a management of UE distributed computing policy associations to NF consumers. The AMF policy control service 202b-5 may provide data management related policies to the AMF 206b. The policy authorization service 202b-6 may authorize and create data-centric policies on request from an AF related to a PDU session that the AF is bound to.

The aforementioned services (and any associated policies) may be facilitated via a use one or more interfaces, such as for example the Ndesmf interface referred to above. Table 1 shown below lists a number of features that may be associated with each of the aforementioned functions/services in some embodiments. It should be kept in mind that the values for the features represented in Table 1 are illustrative, which is to say that other values may be used and/or other features may be included, without departing from the scope and spirit of this disclosure. Furthermore, some of the features may be optional in some embodiments.

TABLE 1

Services And Associated Features

| Service Name | Service Operations | Operation Semantics | Example Consumer(s) |
| --- | --- | --- | --- |
| AMFPolicyControl (202b-5) | Create | Request/Response | AMF |
| | Update | Request/Response | AMF |
| | UpdateNotify | Subscribe/Notify | AMF |
| | Delete | Request/Response | AMF |

TABLE 1-continued

Services And Associated Features

| Service Name | Service Operations | Operation Semantics | Example Consumer(s) |
| --- | --- | --- | --- |
| PolicyAuth (202b-6) | Create | Request/Response | AF, NEF |
| | Update | Request/Response | AF, NEF |
| | Delete | Request/Response | AF, NEF |
| | Notify | Subscribe/Notify | AF, NEF, NWDAF |
| | Subscribe | | AF, NEF, NWDAF |
| | Unsubscribe | | AF, NEF, NWDAF |
| SMPolicyControl (202b-3) | Create | Request/Response | SMF |
| | UpdateNotify | Subscribe/Notify | SMF |
| | Update | Request/Response | SMF |
| | Delete | Request/Response | SMF |
| BDTPolicyCntrl (202b-2) | Create | Request/Response | NEF |
| | Update | Request/Response | NEF |
| | Notify | Subscribe/Notify | NEF |
| UEPolicyCntrl (202b-4) | Create | Request/Response | AMF, V-DCMF |
| | Update | Request/Response | AMF, V-DCMF |
| | UpdateNotify | Subscribe/Notify | AMF, V-DCMF |
| | Delete | Request/Response | AMF, V-DCMF |
| EventExposure (202b-1) | Subscribe | Subscribe/Notify | NEF, NWDAF |
| | Unsubscribe | | |
| | Notify | | |

In some embodiments, data of UE (e.g., the UE 214a of FIG. 2A) may be computed/stored partially or completely by the UE itself, or partially or wholly cloud-connected to single or multiple UPFs (e.g., the UPF 222a of FIG. 2A). A use of multiple UPF nodes may increase the reliability and scalability of a data plane in a network or system. The UPF(s) may be responsible for conveying (e.g., forwarding) user plane data between the UE and one or more systems or networks, such as the Internet. With multiple UPF nodes present, associated networks/systems can distribute the user plane data processing load across multiple UPF instances, reducing a risk of congestion and increasing the overall capacity. In addition, using multiple UPF nodes also provides increased resilience to inoperability (e.g., degraded performance, failures, etc.), as user plane data can be redirected to another UPF instance in case of an outage or failure in one of the UPF nodes.

In some embodiments, a DCSMF (e.g., the DCSMF 202a of FIG. 2A or the DCSMF 202b of FIG. 2B) may manage a UPF where data is stored and/or processed (e.g., computed). The DCSMF may manage any application requirements and map/allocate the requirements to the various UPF instances processing or storing the respective data. The DCSMF may subscribe to, and obtain (e.g., receive), event notifications from the different UPF instances where the respective data is being processed or stored. The notifications may contain information about resource and storage availability of the UPF instances. Based on this information, the DCSMF may distribute the load among the various UPFs.

The DCSMF may provide or manage policies on data channel related resources and data channel media streams, such as allocating/updating/releasing data channel related resources, initiating and terminating one or more data channel media streams, and so on. The DCSMF may perform operations on application data of the data channel media streams, such as sending/reporting on the application data, etc.

As set forth above, various functions or services (or, analogously, microservices) may be supported by a network or system of this disclosure. For example, some of the functions and services associated with 3GPP have been set forth above; additional functions or services may include: a network repository function (NRF), an analytical data repository function (ADRF), a network slice selection function (NSSF), etc. More generally, any type or kind of function or service may be supported, irrespective of whether the function or service is referenced within one or more specifications or standards of one or more bodies. For example, aspects of this disclosure may be applied in respect of proprietary functions or services, thereby providing a network operator or service provider with a degree of flexibility or customization.

As described herein, conventional system and network architectures/platforms lack data-centric services/functions targeted toward application optimization and load balancing. Instead, conventional system/network architectures and platforms tend to utilize a static configuration (e.g., set-it-and-forget-it), which may be effective at the outset but might be misaligned with target goals or objectives from the perspective of application/service QoS or QoE and or network management operations moving forward. Indeed, and as one skilled in the art will appreciate, variations conditions or circumstances may drive a need for a more agile and flexible architecture or platform that is more readily adaptable to changes. In this regard, aspects of this disclosure may include a DCSMF that may dynamically decide policies for traffic and storage enhancements (e.g., optimizations) based on required and available resources. The DCSMF may interact with data management services (e.g., UDM, UDR, ADRF, NWDAF, etc.) to collect data or information for an AF and may use the data/information to frame dynamic data-centric policies. In some embodiments, a DCSMF may collect data from slice instances and frame dynamic policies in accordance therewith, as described in further detail below.

By way of example, and to demonstrate aspects of the foregoing, in practical applications of this disclosure a DCSMF may dynamically move a session (e.g., a PDU session) based on one or more requirements or specifications and, in the process, a realignment of network and computing resources may be realized. In this respect, aspects of this disclosure are highly transformative in nature, as a network or system configuration may be transformed into a different state or thing (e.g., may be transformed from a first network/system topology to a second network/system topology that is different from the first network/system topology). In some instances, a service may be initiated via multiple PDU or resource-based sessions. A DCSMF may coordinate with a consumer (e.g., a UE or NF) to determine a computational load that can be offloaded, which may be based at least in part on security considerations.

Figure 2C:
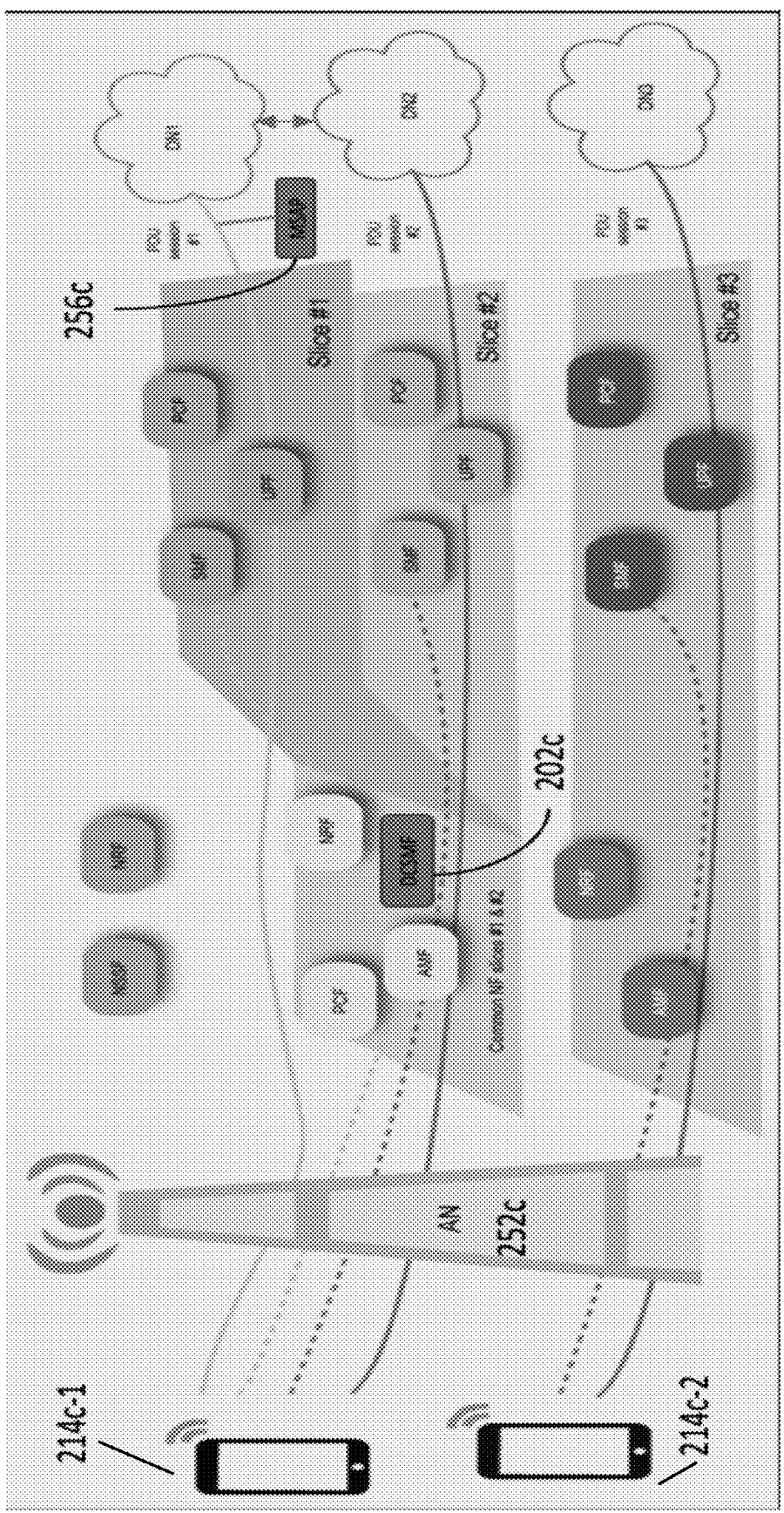

In some embodiments, functionality or service support may be allocated to one or more network slices. For example, a microservice may be separated/split into multiple instances, which may be beneficial from a perspective of balancing load in respect of available resources. With reference to FIG. 2C, a system 200c (which, in some embodiments, may be operatively overlaid or combined with one or more parts/portions of the system 100, the system 200a, and/or the system 200b of FIGS. 1, 2A, and 2B) is shown that may be operative in conjunction with slicing. In particular, in FIG. 2C a first UE 214c-1 may be associated with a first PDU session (e.g., PDU session #1 via a cloud or data network DN1) and a second PDU session (e.g., PDU session #2 via a cloud or data network DN2), and a second UE 214c-2 may be associated with a third PDU session (e.g., PDU session #3 via a cloud or data network DN3). The first PDU session may be administered/supported via a first network slice (e.g., Slice #1), the second PDU session may be administered/supported via a second network slice (e.g., Slice #2), and the third PDU session may be administered/supported via a third network slice (e.g., Slice #3). The UEs 214c-1 and 214c-2 may connect to an access node (AN) 252c as part of obtaining communication services.

As shown in FIG. 2C, each of the aforementioned network slices #1-#3 may be composed of resources or functions (e.g., SMF, PCF, UPF, AMF, NRF, etc.) that may enable the respective network slice to discharge its duties or functionality in supporting applications or services. It should be borne in mind that the functions for each of the network slices #1-#3 shown in FIG. 2C are illustrative, which is to say that other functions or resources may be utilized in some embodiments and/or some of the functions shown may be optional. Furthermore, there may be multiple instances of a given function located within a given network slice, which may assist in enhancing a capacity of the network slice for supporting communication or application services of particular kinds or types.

It will be appreciated by one skilled in the art reviewing this disclosure that the depiction in FIG. 2C may be representative of a configuration of the system 200c at a particular moment in time. Due to changes in conditions or circumstances (whether environmentally driven, as a result of a change in application or service requirements, as a result of a change in network/system conditions (e.g., network/system loads) or resource utilization, etc.) the allocation of applications, services, or sessions amongst functions or network slices may be adapted/modified to achieve/realize particular goals or requirements. An anchor (e.g., a PDU session anchor) that is utilized may be dependent on factors like whether a task is being fully offloaded to a different network slice, or whether the task is being split into two or more network slices. In this respect, three use-case scenarios are described below to facilitate a management of slices or resources as part of a practical application. It should be kept in mind that aspects of this disclosure may be implemented in connection with other scenarios as part of other practical applications.

In a first scenario, it may be assumed that the conditions/circumstances warrant a reallocation of network or service functionality into a different part of a same/common slice—e.g., an intra-slice reallocation. As part of this first scenario, a UPF that was used/allocated may act as a session anchor, and session and service continuity (SSC) mode 3 may be used. Connectivity provided to the UE may be preserved during the reallocation, but an Internet Protocol (IP) address allocated to the UE may be updated if the anchor UPF is changed as part of the reallocation. In this case, if a session is completely offloaded to a different part of the common slice, then the serving UPF may continue to act as session anchor. However, if a session is partially reallocated, and a different UPF is assigned for the reallocated session, then a multi session anchor point (MSAP) 256c may act as session merger.

In a second scenario, it may be assumed that the conditions/circumstances warrant a complete reallocation of network or service functionality to a different network slice (e.g., from a first network slice to a second network slice that is different from the first network slice). As part of this second scenario, SSC mode 3 may be used where connectivity provided to the UE may be preserved during the reallocation, but an Internet Protocol (IP) address allocated to the UE will be updated since the anchor UPF changes.

In a third scenario, it may be assumed that the conditions/circumstances warrant a partial reallocation of network or service functionality to another network slice (e.g., a partial reallocation from a first network slice to at least a second network slice that is different from the first network slice, such that after the reallocation the first network slice administers/supports a first portion of the network or service functionality and the at least a second network slice administers/supports a second portion of the network or service functionality). In this third scenario, it may be the case that an existing UPF cannot act as an anchor (e.g., a PDU session anchor) for the entire session following the reallocation. In this case, an additional anchor point beyond a UPF may be needed. In this respect, and as shown in FIG. 2C, the multi session anchor point (MSAP) 256c may be utilized. An MSAP (such as, for example, the MSAP 256c, or the MSAP 256a (and associated service-based interface Nmsap of FIG. 2A)) may be responsible for merging the PDU sessions of the network slices that are utilized in such a way that synchronization and coherency are maintained. The merger may occur at one or more layers, such as an application layer of a multi-layer stack/platform. The MSAP may be responsible for merging of multiple (e.g., two or more) PDU sessions and a DCSMF (e.g., the DSCMF 202c of FIG. 2C) may dynamically divide or otherwise manage transmissions (e.g., data transmissions) across the sessions based on the network/system conditions. The UPF may still act as session anchor for each slice instance for the session and MSAP may merge all the sessions. The MSAP may be a user plane entity, and may involve some control plane signaling messages via the service-based interface Nmsap, similar to UPF, like establishment, and release of two sessions or data path. This signaling may also be used to set up necessary tunnels and encryptions for security and to maintain the quality of service if necessary.

As a more specific example of the third scenario referenced above, it may be assumed that an application or service that is being supported by a network or system is associated with a multi-player online (MPO) game. Further, it may be assumed that the various elements of the gameplay associated with a given player or communication device involved in the MPO game include video sourced from a camera and audio sourced from a microphone. The video and the audio may be associated with their own respective data flows (e.g., their own respective IP flows). If the conditions or circumstances are such that the video and audio flows should be split across multiple network slices (as determined by, e.g., a DSCMF), an MSAP may be utilized to ensure consistency, coherency, and synchronization between the video and audio flows. In this respect, a quality or integrity in a provisioning of communication services may be maintained, despite the splitting of the flows across two or more network slices.

Figure 2D:
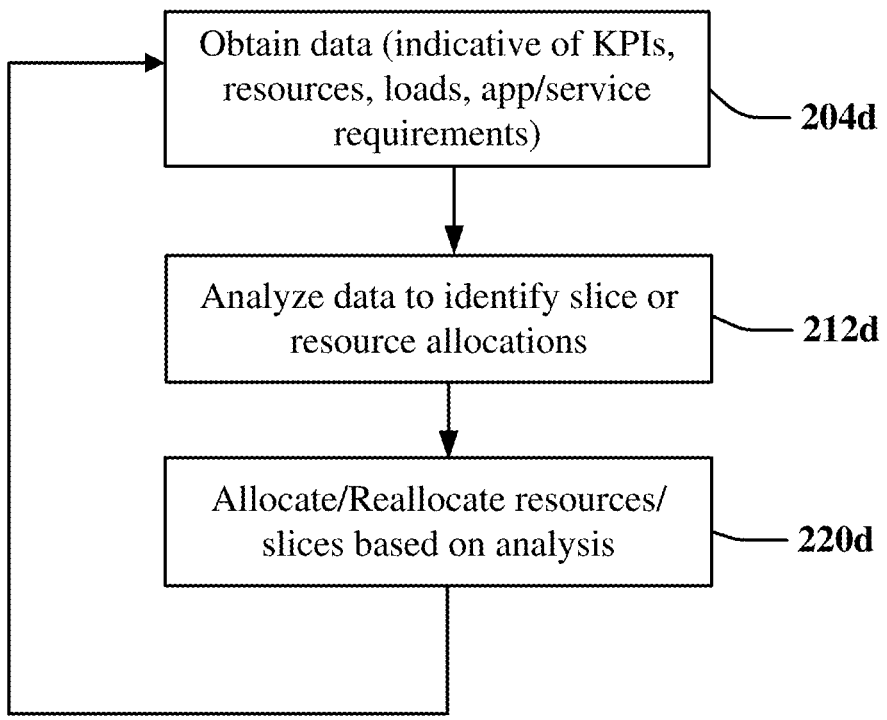
FIG. 2D depicts an illustrative embodiment of a method in accordance with various aspects described herein.

Referring now to FIG. 2D, an illustrative embodiment of a method 200d in accordance with various aspects described herein is shown. One or more parts/portions of the method 200d may be implemented or executed, in whole or in part, in conjunction with one or more systems, devices, and/or components, such as for example the systems, devices, and components set forth herein. The method 200d may be implemented or executed via a processing system that may include one or more processors. The processing system may execute instructions that facilitate a performance of operations; the operations are described below in relation to the blocks of the method 200d. The instructions may be stored by, e.g., one or more memory devices, memories, computer or machine readable-medium, or the like.

In block 204d, data may be obtained. The data may include (first) data indicative of key performance indicators (KPIs), (second) data indicative of available or consumed resources (e.g., network or system resources), (third) data indicative of network or system loads (actual or predicted), (fourth) data indicative of application (app) or service level requirements, etc.

In block 212d, the data obtained as part of block 204d may be analyzed. The analysis of block 212d may occur via a utilization or engagement of one or more algorithms or models. In some embodiments, the algorithms or models may incorporate one or more DSCMFs of this disclosure. In some embodiments, the analysis of block 212d may be facilitated via machine learning (ML) and/or artificial intelligence (AI) technologies. The analysis of block 212d may generate indicators/indications of slice (e.g., network/system slice) or resource allocations.

In block 220d, the slice or resource allocations identified/determined/selected as part of block 212d may be effectuated. For example, as part of an initial execution of the method 200d resources or slices may be allocated to a first use (e.g., a first application or service) and in a subsequent execution of the method 200d the resources or slices may be reallocated to another or different use (e.g., a second application or service). In this respect, it is noted that the method 200d is shown in FIG. 2D as a loop based on the flow from block 220d to block 204d. As one skilled in the art will appreciate, the nature of the loop may be such that data may be acquired or reacquired (e.g., periodically, as part of a schedule, based on a detection of an occurrence of one or more events or conditions, based on a change in circumstances, etc.), and adaptations or modifications of slices or resources may be made based on what is represented by/within the data.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Practical applications of this disclosure generate useful, concrete, and tangible results in terms of improving or enhancing quality of service (QOS) and/or quality of experience (QoE) in communication networks and systems with limited resources available. As set forth herein, practical applications of this disclosure may monitor conditions or circumstances that warrant a reallocation or redeployment of scarce resources from a first use or purpose to a second use or purpose. The reallocation or redeployment may occur in a way that is (largely) transparent to an end-user or associated communication device, thereby reducing (or even completely eliminating) any burden that might otherwise have been imposed on the end-user/communication device. Aspects of this disclosure provide for a proper treatment of streams or flows of application or service traffic under various network/system conditions, which may improve QoS/QoE and reduce network/subscriber churn, while at the same time tending to increase efficiency in terms of resource utilization and reducing capital expenditure (CAPEX) investment. Thus, aspects of this disclosure represent substantial improvements relative to conventional techniques in terms of application support and a provisioning of communication services given a finite set of resources. The various aspects of this disclosure may be tied to specifically/specially programmed machines or apparatuses to achieve the transformative results set forth herein. Such transformative results may include a dynamic reallocation of resources to shape traffic to meet demands or changes in conditions or circumstances. Suffice it to say, and as one of skill in the art will appreciate based on a review of this disclosure, the various aspects of this disclosure are not directed to abstract ideas. To the contrary, the various aspects of this disclosure are directed to, and encompass, significantly more than any abstract idea standing alone.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of the system 100, the subsystems and functions of the system 200a, the system 200b, the system 200c, and the method 200d presented in FIGS. 1 and 2A-2D. For example, the virtualized communication network 300 can facilitate in whole or in part obtaining data, the data including first data indicative of a first amount of resources available as part of a first network slice of a plurality of network slices of a communication network, analyzing the data to determine that at least a first portion of a service provisioned via the first network slice is to be reallocated to at least a second network slice of the plurality of slices, and reallocating, based on the analyzing, the at least a first portion of the service to the at least a second network slice. The virtualized communication network 300 can facilitate in whole or in part analyzing data pertaining to: a requirement of an application, an amount of resources consumed relative to a capacity of the resources, and a network condition, determining, based on the analyzing, that at least some of a network functionality is to be transferred from a first portion of a network slice to a second portion of the network slice as part of providing communication services in relation to an execution of the application, and transferring, based on the determining, the at least some of a network functionality from the first portion to the second portion. The virtualized communication network 300 can facilitate in whole or in part collecting, by a processing system including a processor, data from a plurality of slices of a communication system, identifying, by the processing system, a security parameter associated with a function facilitated by the communication system, analyzing, by the processing system, the data in conjunction with the security parameter to determine that the function is to be reallocated from a first resource to a second resource that is different from the first resource, resulting in a determination, and reallocating, by the processing system, the function from the first resource to the second resource in accordance with the determination.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
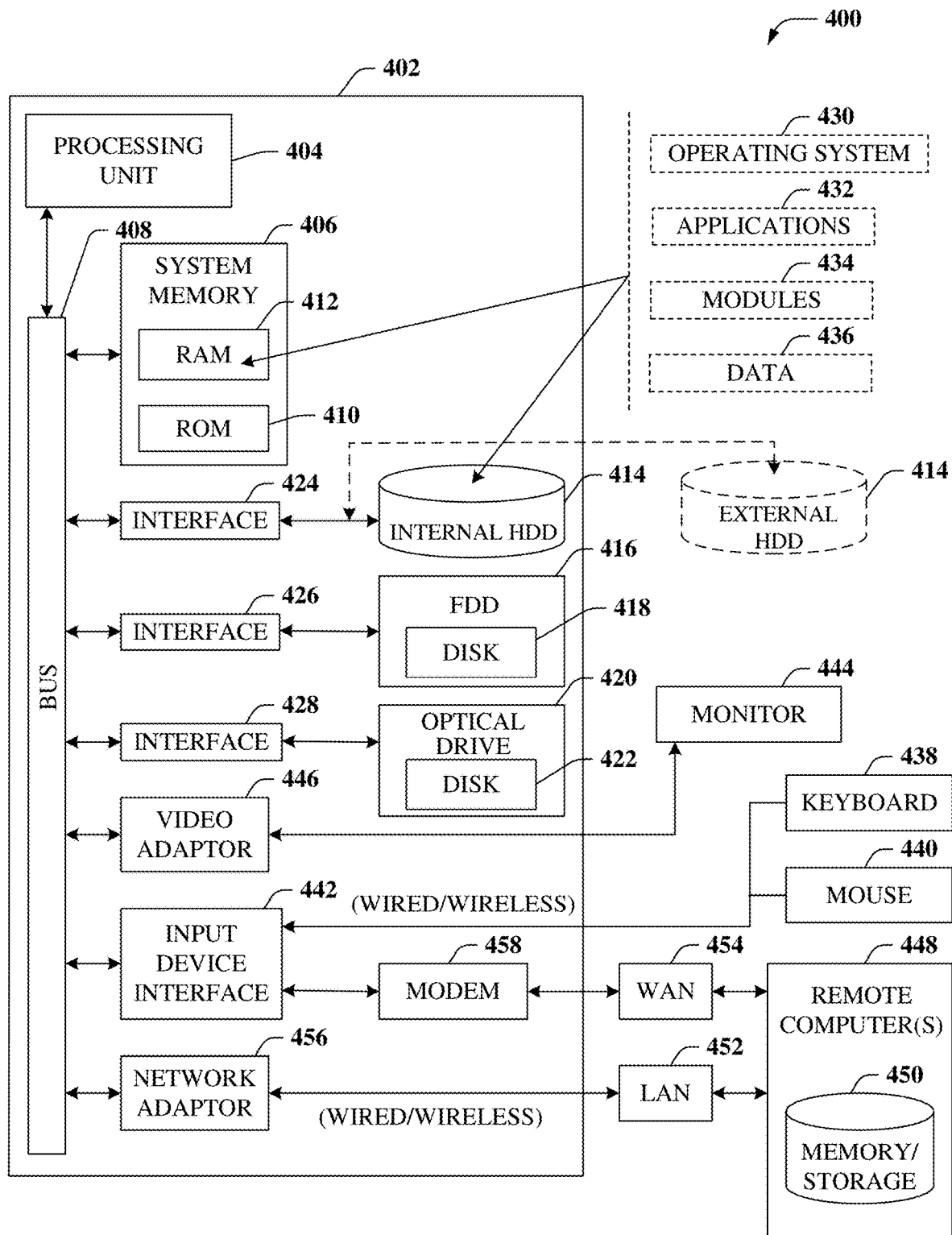
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate in whole or in part obtaining data, the data including first data indicative of a first amount of resources available as part of a first network slice of a plurality of network slices of a communication network, analyzing the data to determine that at least a first portion of a service provisioned via the first network slice is to be reallocated to at least a second network slice of the plurality of slices, and reallocating, based on the analyzing, the at least a first portion of the service to the at least a second network slice. The computing environment 400 can facilitate in whole or in part analyzing data pertaining to: a requirement of an application, an amount of resources consumed relative to a capacity of the resources, and a network condition, determining, based on the analyzing, that at least some of a network functionality is to be transferred from a first portion of a network slice to a second portion of the network slice as part of providing communication services in relation to an execution of the application, and transferring, based on the determining, the at least some of a network functionality from the first portion to the second portion. The computing environment 400 can facilitate in whole or in part collecting, by a processing system including a processor, data from a plurality of slices of a communication system, identifying, by the processing system, a security parameter associated with a function facilitated by the communication system, analyzing, by the processing system, the data in conjunction with the security parameter to determine that the function is to be reallocated from a first resource to a second resource that is different from the first resource, resulting in a determination, and reallocating, by the processing system, the function from the first resource to the second resource in accordance with the determination.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
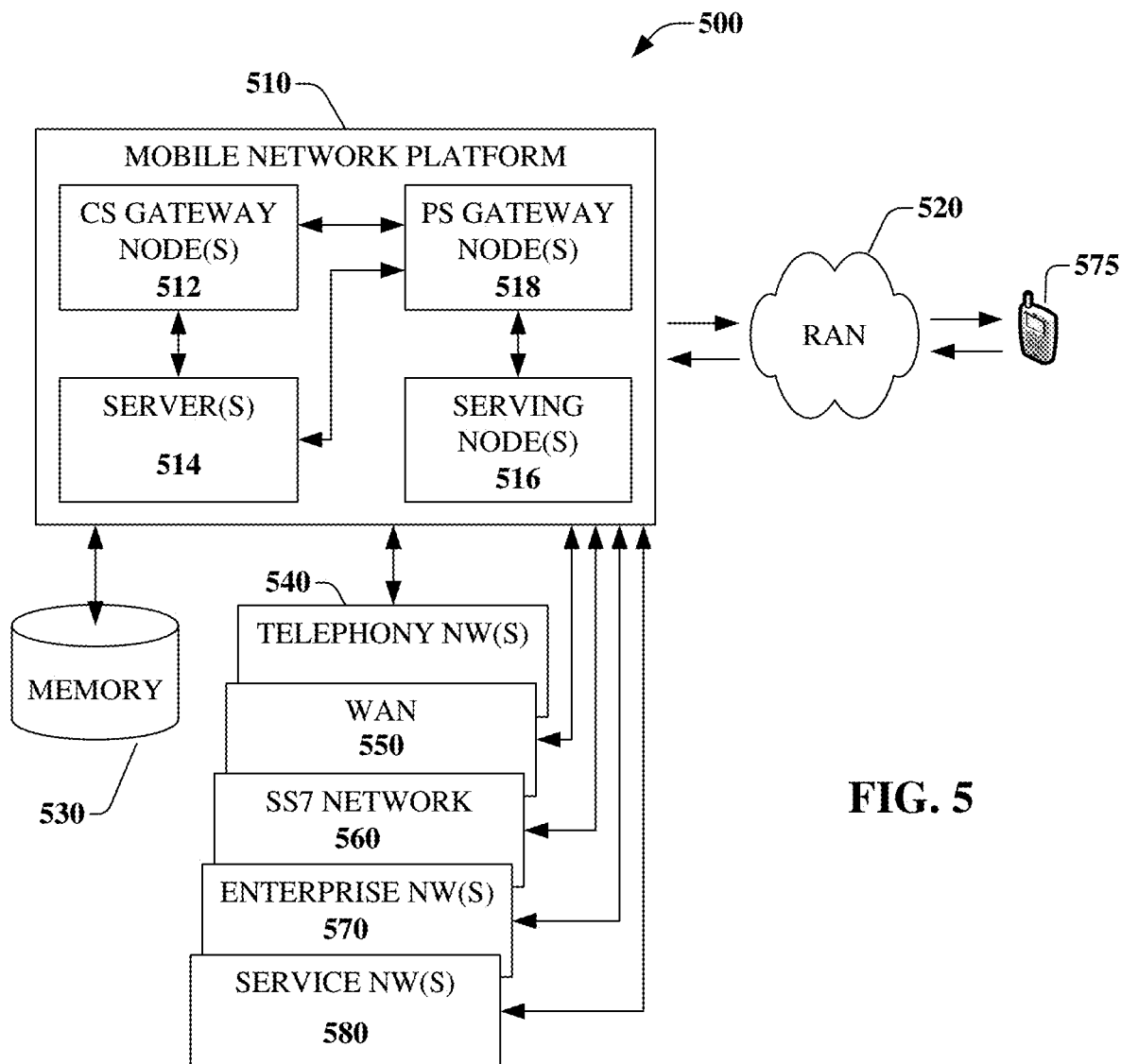
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the platform 510 can facilitate in whole or in part obtaining data, the data including first data indicative of a first amount of resources available as part of a first network slice of a plurality of network slices of a communication network, analyzing the data to determine that at least a first portion of a service provisioned via the first network slice is to be reallocated to at least a second network slice of the plurality of slices, and reallocating, based on the analyzing, the at least a first portion of the service to the at least a second network slice. The platform 510 can facilitate in whole or in part analyzing data pertaining to: a requirement of an application, an amount of resources consumed relative to a capacity of the resources, and a network condition, determining, based on the analyzing, that at least some of a network functionality is to be transferred from a first portion of a network slice to a second portion of the network slice as part of providing communication services in relation to an execution of the application, and transferring, based on the determining, the at least some of a network functionality from the first portion to the second portion. The platform 510 can facilitate in whole or in part collecting, by a processing system including a processor, data from a plurality of slices of a communication system, identifying, by the processing system, a security parameter associated with a function facilitated by the communication system, analyzing, by the processing system, the data in conjunction with the security parameter to determine that the function is to be reallocated from a first resource to a second resource that is different from the first resource, resulting in a determination, and reallocating, by the processing system, the function from the first resource to the second resource in accordance with the determination.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
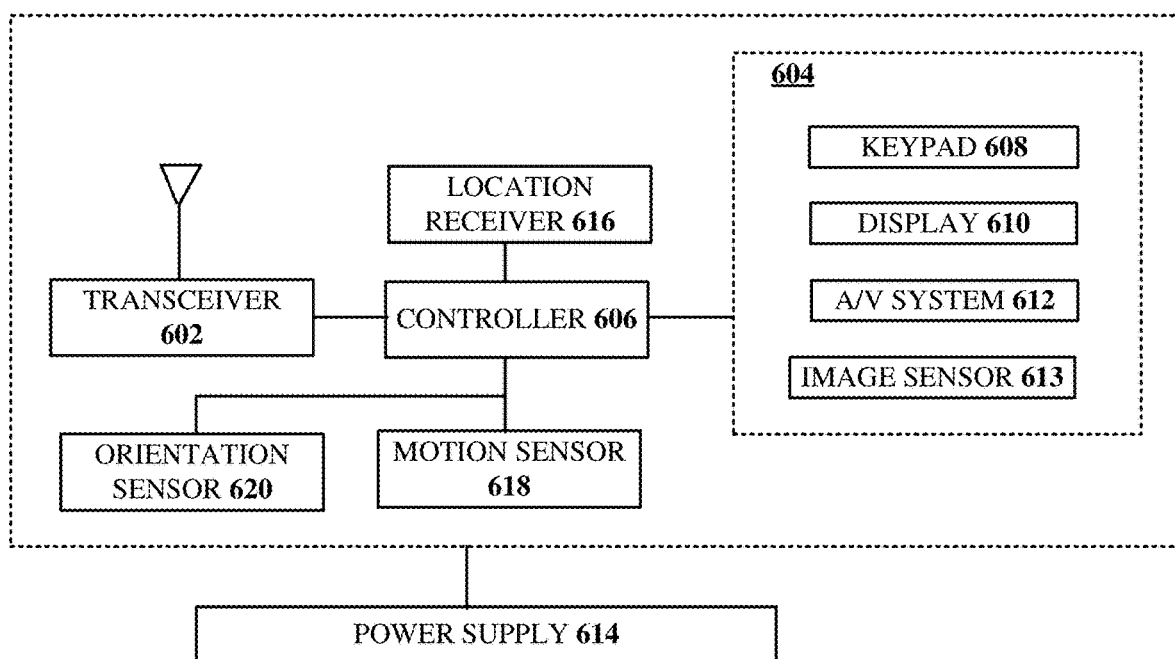
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the computing device 600 can facilitate in whole or in part obtaining data, the data including first data indicative of a first amount of resources available as part of a first network slice of a plurality of network slices of a communication network, analyzing the data to determine that at least a first portion of a service provisioned via the first network slice is to be reallocated to at least a second network slice of the plurality of slices, and reallocating, based on the analyzing, the at least a first portion of the service to the at least a second network slice. The computing device 600 can facilitate in whole or in part analyzing data pertaining to: a requirement of an application, an amount of resources consumed relative to a capacity of the resources, and a network condition, determining, based on the analyzing, that at least some of a network functionality is to be transferred from a first portion of a network slice to a second portion of the network slice as part of providing communication services in relation to an execution of the application, and transferring, based on the determining, the at least some of a network functionality from the first portion to the second portion. The computing device 600 can facilitate in whole or in part collecting, by a processing system including a processor, data from a plurality of slices of a communication system, identifying, by the processing system, a security parameter associated with a function facilitated by the communication system, analyzing, by the processing system, the data in conjunction with the security parameter to determine that the function is to be reallocated from a first resource to a second resource that is different from the first resource, resulting in a determination, and reallocating, by the processing system, the function from the first resource to the second resource in accordance with the determination.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining data, wherein the data includes first data indicative of a first amount of resources available as part of a first network slice of a plurality of network slices of a communication network, wherein the data further includes second data indicative of a quality requirement associated with a service provisioned via the first network slice, wherein the quality requirement is based on an identified consumer, and wherein the consumer corresponds to user equipment;
   analyzing the data to determine a first portion of the service provisioned via the first network slice is to be reallocated to at least a second network slice of the plurality of network slices wherein a second portion of the service remains provisioned via the first network slice; and
   reallocating, based on the analyzing, the first portion of the service to the at least a second network slice, wherein both the first portion and the second portion satisfy the quality requirement associated with the first network slice after the reallocating.

2. The device of claim 1, wherein the at least a second network slice includes the second network slice and a third network slice of the plurality of network slices.

3. The device of claim 1, wherein the first network slice includes a first instance of a first function, and wherein the at least a second network slice includes a second instance of the first function.

4. The device of claim 1, wherein the first network slice includes a first function and the at least a second network slice includes a second function that is different from the first function.

5. The device of claim 1, wherein a network slice of the plurality of network slices includes a first function in a first part of the network slice and a second function that is different from the first function in a second part of the network slice, the second part being different from the first part.

6. The device of claim 1, wherein a network slice of the plurality of network slices includes a first instance of a first function in a first part of the network slice and a second instance of the first function in a second part of the network slice, the second part being different from the first part.

7. The device of claim 1, wherein the data further includes third data indicative of a second amount of resources available as part of the at least a second network slice.

8. The device of claim 1, wherein the operations further comprise:
identifying the consumer of the service.

9. The device of claim 1, wherein the data further includes third data indicative of a load supported by the communication network.

10. The device of claim 1, wherein the reallocating of the at least a first portion of the service to the at least a second network slice includes reallocating an entirety of the service to the second network slice.

11. The device of claim 1, wherein the reallocating of the at least a first portion of the service to the at least a second network slice includes reallocating less than an entirety of the service to the second network slice such that the second portion of the service is retained at the first network slice following the reallocating.

12. The device of claim 11, wherein the communication network includes an anchor that merges first communication data associated with the first portion of the service and second communication data associated with the second portion of the service.

13. The device of claim 12, wherein the first communication data is associated with a first Internet Protocol (IP) flow and the second communication data is associated with a second IP flow that is different from the first IP flow.

14. The device of claim 12, wherein the first communication data includes video data.

15. The device of claim 12, wherein the second communication data includes audio data.

16. A non-transitory machine-readable medium, comprising executable instructions that, when executed by a processing system including a processor, facilitate performance of operations, the operations comprising:
analyzing requirement data pertaining to: a requirement of an application, an amount of resources consumed relative to a capacity of the resources, a network condition, and a quality requirement associated with a network slice, wherein the quality requirement is based on an identified consumer, and wherein the consumer corresponds to user equipment;
determining, based on the analyzing, that at least some of a network functionality is to be transferred from a first portion of the network slice to a second portion of the network slice as part of providing communication services in relation to an execution of the application; and
transferring, based on the determining, the at least some of a network functionality from the first portion to the second portion, wherein the execution of the application satisfies the requirement data associated with the network slice.

17. The non-transitory machine-readable medium of claim 16, wherein the transferring causes a reassignment of an anchor from a first instance of a user plane function to a second instance of the user plane function.

18. The non-transitory machine-readable medium of claim 16, wherein the operations further comprise identifying the consumer.

19. A method, comprising:
collecting, by a processing system including a processor, data from a plurality of slices of a communication system, wherein the data is indicative of a quality requirement associated with a service provisioned via a first slice of the plurality of slices, wherein the quality requirement is based on an identified consumer, and wherein the consumer corresponds to user equipment;
identifying, by the processing system, a security parameter associated with a function facilitated by the communication system;
analyzing, by the processing system, the data in conjunction with the security parameter to determine that the function is to be reallocated from a first resource to a second resource that is different from the first resource, resulting in a determination; and
reallocating, by the processing system, the function from the first resource to the second resource in accordance with the determination, wherein the function from the second resource satisfies the quality requirement associated with the service provisioned via the first slice.

20. The method of claim 19, further comprising identifying, by the processing system, the consumer.

* * * * *